United States Patent
Loisy

(10) Patent No.: US 7,363,757 B2
(45) Date of Patent: Apr. 29, 2008

(54) TURBINE ENGINE WITH SEMI-FIXED TURBINE DRIVING A RECEIVER CONTROLLED SO AS TO PRESERVE A ROUGHLY CONSTANT ROTATION SPEED

(75) Inventor: Jean Loisy, Ponthierry (FR)

(73) Assignee: Snecma, Paris (FR)

( * ) Notice: Subject to any disclaimer, the term of this patent is extended or adjusted under 35 U.S.C. 154(b) by 387 days.

(21) Appl. No.: 11/028,233

(22) Filed: Jan. 4, 2005

(65) Prior Publication Data
US 2008/0060341 A1 Mar. 13, 2008

(30) Foreign Application Priority Data
Jan. 8, 2004 (FR) .................................. 04 50047

(51) Int. Cl.
*F02C 3/00* (2006.01)
*F02C 7/36* (2006.01)

(52) U.S. Cl. ........................................ 60/226.1; 60/792

(58) Field of Classification Search .............. 60/226.1, 60/792, 262, 804
See application file for complete search history.

(56) References Cited
U.S. PATENT DOCUMENTS 2,583,872 A 1/1952 Newcomb
3,611,834 A * 10/1971 Dison ..................... 60/226.1
3,729,957 A * 5/1973 Petrie et al. .............. 60/226.1
3,792,586 A * 2/1974 Kasmarik et al. ......... 60/226.1
3,886,737 A * 6/1975 Grieb ...................... 60/226.1
4,005,575 A * 2/1977 Scott et al. ............... 60/226.1
4,287,715 A * 9/1981 Klees ..................... 60/226.1
4,446,696 A 5/1984 Sargisson et al.
6,082,967 A 7/2000 Loisy

FOREIGN PATENT DOCUMENTS

| DE | 39 33 776 A1 | 4/1991 |
|---|---|---|
| EP | 0 867 607 A1 | 9/1998 |
| FR | 2 508 552 | 12/1982 |
| GB | 1 411 380 | 10/1975 |
| GB | 2 377 731 | 1/2003 |

* cited by examiner

*Primary Examiner*—Ted Kim
(74) *Attorney, Agent, or Firm*—Oblon, Spivak, McClelland, Maier & Neustadt, P.C.

(57) ABSTRACT

The invention relates to a turbine engine (1) with a semi-fixed turbine, particularly for aircraft driving a receiver (2) controlled so as to preserve a roughly constant rotation speed. The turbine engine, in particular via a gear system (20), drives the receiver and an LP compressor (6) with an LP turbine (14). According to the invention, the gear system has a torque control system (26) maintaining a constant ratio between the drive torque of the receiver transmitted by the gear system and the drive torque of the LP compressor transmitted by this same gear system.

9 Claims, 2 Drawing Sheets

TURBINE ENGINE WITH SEMI-FIXED TURBINE DRIVING A RECEIVER CONTROLLED SO AS TO PRESERVE A ROUGHLY CONSTANT ROTATION SPEED

TECHNICAL DOMAIN

The present invention generally relates to a turbine engine, particularly for aircraft, and more specifically to a turbine engine with a semi-fixed turbine driving a receiver controlled so as to preserve a roughly constant rotation speed whatever the power required of this turbine engine.

STATE OF THE PREVIOUS TECHNOLOGY

The previous technology is known to provide for turbine engines with a low pressure compressor followed by a high pressure compressor for the purpose of obtaining higher compression ratios than those found in turbine engines equipped with a single compressor.

As is well-known, these low and high pressure compressors are driven by successive high and low pressure turbines, these various elements being called <<LP compressor>>, <<HP compressor>>, <<HP turbine>> and <<LP turbine>> in the course of the description.

The two main types of two-compressor turbine engines known in the previous technology are first of all turbine engines <<with free turbines>>, then turbine engines <<with semi-fixed turbines>>.

It is noted that in turbine engines with free turbines the receiver is driven by a third turbine which has no mechanical link with the LP and HP turbines, while in turbine engines with semi-fixed turbines, the receiver is driven by the LP turbine like the LP compressor. In the latter case, traditionally, the LP compressor is linked directly to the LP turbine by a shaft provided for this while the receiver is generally driven by a system of gears linked to this LP turbine.

Generally, to ensure correct functioning of the receiver, the rotation speed of the latter must be maintained roughly constant, whatever the power required from this turbomachine.

In this respect, it is specified that turbine engines with free turbines accept this condition without this causing serious dysfunctions, in the sense that their partial power behaviour remains relatively satisfactory. However, the presence of three turbines as well as their three linked shafts requires the design of complex and costly turbine engines presenting significant congestion problems.

On the other hand it must be clear that if turbine engines with semi-fixed turbines have a less complex design than turbine engines with free turbines, the maintenance of a receiver with roughly constant speed can, however, lead to the appearance of not insignificant partial power problems.

Indeed, when turbine engines function with partial power and therefore with a weak fuel flow, the high pressure casing with the HP compressor and the HP turbine necessarily slows down. The receiver's rotation speed, like a propeller, is kept roughly constant, meaning that the rotation speed of the HP compressor as well as that of the LP turbine are both kept roughly constant. In this respect it is specified that keeping a constant value in the receiver's rotation can for example be obtained by reducing the pitch of the propeller by reducing the fuel flow only, of course, where the receiver is made up of a variable pitch propeller.

Thus one can see that with partial power, the high pressure casing slows down while the LP compressor continues to operate at the same speed, which inevitably engenders significant pumping risks for the LP compressor.

Moreover, still with regard to low power, one can see that the LP turbine is in aerodynamic overspeed because of the reduction in the speed of the sound resulting from the drop in temperature while the mechanical operating conditions of this LP turbine are kept constant. Therefore the aerodynamic overspeed encountered, in conjunction with a reduction in the power provided by the turbine engine, heavily degrades the performance of the LP turbine.

To tackle the very high surging risk of the LP compressor it was proposed to design variable setting stators and/or to attach discharges in both cases to reduce the air flow crossing the HP compressor.

However, these solutions present certain limits. In fact beyond a dwell angle of the setting, the turbine blades can no longer function correctly, leading to an aerodynamic design problem as well as limits to the reduction in the flow that can be realised with a given power.

In addition the task of a discharge consists in ejecting compressed air, which heavily degrades the performance of the turbine engine. Moreover, designing and controlling systems capable of simultaneously holding strong pressures and running high flows remains very difficult to realise. Installation of these systems on the casing located between the two compressors also complicates the design of this same casing.

Consequently, all the statements made above clearly highlight the limits to discharging the flow.

OBJECT OF THE INVENTION

The invention therefore aims to offer a turbine engine with a semi-fixed turbine, particularly for aircraft driving a receiver controlled so as to preserve a roughly constant rotation speed, the turbine engine remedying the drawbacks mentioned above relating to the performance of the previous technology.

In order to do this the object of the invention is a turbine engine with a semi-fixed turbine, particularly for aircraft, driving a receiver controlled so as to preserve a roughly constant rotation speed. The turbine engine has a HP compressor, a combustion annulus, a HP turbine as well as an LP turbine the latter, particularly via a gear system, driving the receiver and the LP compressor. According to the invention, the gear system has a torque control system maintaining a constant ratio between the driver torque of the receiver transmitted by the gear system and the driver torque of the LP compressor transmitted by this same gear system.

The improvement lies in the fact that with partial power, the torque control system provided for the turbine engine according to the invention makes it possible to engender a significant reduction of the rotation speed of the LP compressor while maintaining the rotation speed of the receiver roughly constant.

This is explained by the fact that when the power absorbed by the receiver is reduced with its rotation speed maintained constant, the driver torque which is transmitted to it is also necessarily reduced. The presence of the torque control system thus implies that the driver torque transmitted to the HP compressor is reduced in the same proportions leading to a reduction in the rotation speed of this same LP compressor.

In this way it is noted that providing for a torque control system totally removes the surging risks of the LP compressor without necessarily having recourse to variable setting stators and/or discharges.

On the other hand, with partial power the presence of the torque control system generates a reduction in the rotation speed of the LP turbine. This is explained by the fact that the torque control system imposes not only a proportionality ratio between the couples transmitted to the receiver and to the LP compressor but also imposes a ratio between their respective rotation speeds such that the reduction of the LP compressor rotation speed while the rotation speed of the receiver remains roughly constant leads to a reduction in the rotation speed of the LP turbine in lower ratios. Of course this makes it possible to reduce the aerodynamic overspeeds of the latter and therefore to attenuate the degradation in the performance of this same LP turbine.

The gear system will preferably have an inlet, preferably unique, integral with a LP turbine shaft as well as first and second outlets, the first outlet being integral with a LP compressor shaft and the second outlet integral with a receiver shaft. Thus, the receiver is driven solely by the LP turbine shaft via a gear system playing the part of a reduction gear and providing a constant ratio between the driver torque of the receiver and the driver torque of the LP compressor. It must therefore be understood that the power of a single LP turbine shaft is shared between the receiver and this same LP compressor.

Moreover this turbine engine also has an HP turbine shaft integral with the HP turbine and HP compressor.

It is also noted that when the LP compressor is solely driven via the torque control system from the LP turbine, the reduction caused by the rotation speed of the LP compressor can sometimes be excessive causing degradation in the performance of this LP compressor. To tackle this problem therefore, and according to the preferred operational mode of the present invention, the turbine engine can also have an intermediate turbine placed between the HP and LP turbines and this intermediate turbine is integrally linked to the LP compressor using an intermediate turbine shaft.

In such a configuration, the LP compressor is no longer exclusively driven by the LP turbine, but also by this intermediate turbine. Consequently, because only part of the overall driver torque of the LP compressor is proportionate to the couple absorbed by the receiver, the drop in rotation speed of the LP compressor is less marked in partial power, and its performance is roughly optimised.

The control system will preferably have a satellite carrier at the entrance of the gear system, a multiplicity of satellite pinions meshing with a planetary pinion-linked to the first outlet of the gear system and a crown gear connected to the second outlet of the gear system.

Finally, the receiver can be an element taken from the group made up of a variable pitch propeller, a variable pitch Prop-Fan (transonic propeller), a variable pitch counter-rotating propeller, a helicopter propeller, and an alternator. Of course, other receivers can be envisaged, the sole condition being that they must be able to be controlled so as to preserve a roughly constant rotation speed whatever the power developed by the turbine engine.

Other advantages and features of the invention will appear in the non-restrictive detailed description below.

BRIEF DESCRIPTION OF THE DRAWINGS

This description will be made in relation to the annexed drawings among which.

DETAILED DESCRIPTION OF PREFERRED EMBODIMENTS

Figure 1:
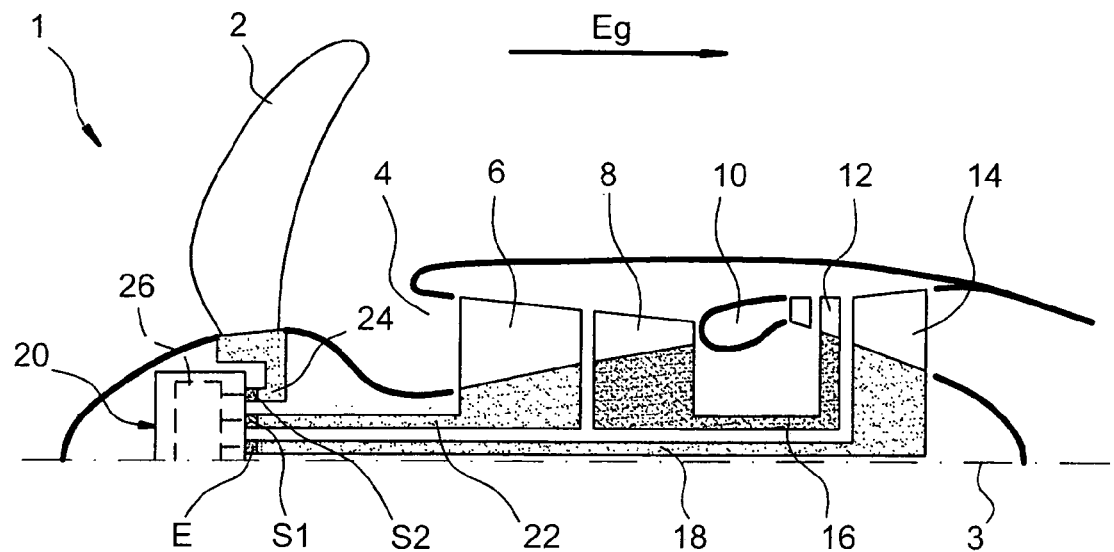
FIG. 1 represents a schematic view in longitudinal half-section of a turbine engine with semi-fixed turbine according to a preferred first embodiment of the present invention.

FIG. 1 represents a turbine engine 1 with semi-fixed turbine, particularly for aircraft according to a preferred first embodiment of the present invention.

Going downstream in a main gas flow direction through the gas drawn by a referenced arrow Eg parallel with a main longitudinal axis 3 of the turbine engine 1, the latter includes an annular intake of air 4, an LP compressor 6, an HP compressor 8, a combustion chamber 10, a HP turbine 12, and an LP turbine 14. As can be seen on FIG. 1, turbine engine 1 drives a receiver 2 arranged upstream of the air intake 4 and controlled so as to preserve a roughly constant rotation speed whatever the power required from this turbine engine 1, the receiver 2 being preferably a variable pitch propeller type.

A high pressure casing of the turbine engine 1 is formed by the HP compressor 8 and the HP turbine 12. These two elements are linked integrally using a HP turbine shaft 16.

On the other hand a low pressure casing of turbine engine 1 is formed by the LP compressor 6 and the LP turbine 14. In this respect, it is noted that the LP turbine 14 drives the LP compressor 6 and the variable pitch propeller 2 jointly via a LP turbine shaft 18 and a gear system 20.

To do this the LP turbine shaft 18 is integrally connected to an inlet E of the gear system 20, the latter also with a first inlet S1 integral with an LP compressor shaft 22 as well as a second outlet S2 integral with a receiver shaft 24.

The special feature of this invention resides in the fact that the gear system 20 has a torque control system 26 maintaining a constant ratio between the driver torque of the receiver 2 transmitted by the gear system 20 and the driver torque of the LP compressor 6 transmitted by this same gear system 20.

In this way, with partial power and therefore when the propeller pitch 2 has been reduced, the torque control system 26 then makes it possible to create a significant reduction in rotation speed of the LP compressor 6, while maintaining roughly constant the rotation speed of this propeller 2. Thus a total removal of the surge risks of this LP compressors can be observed 6.

Figure 2:
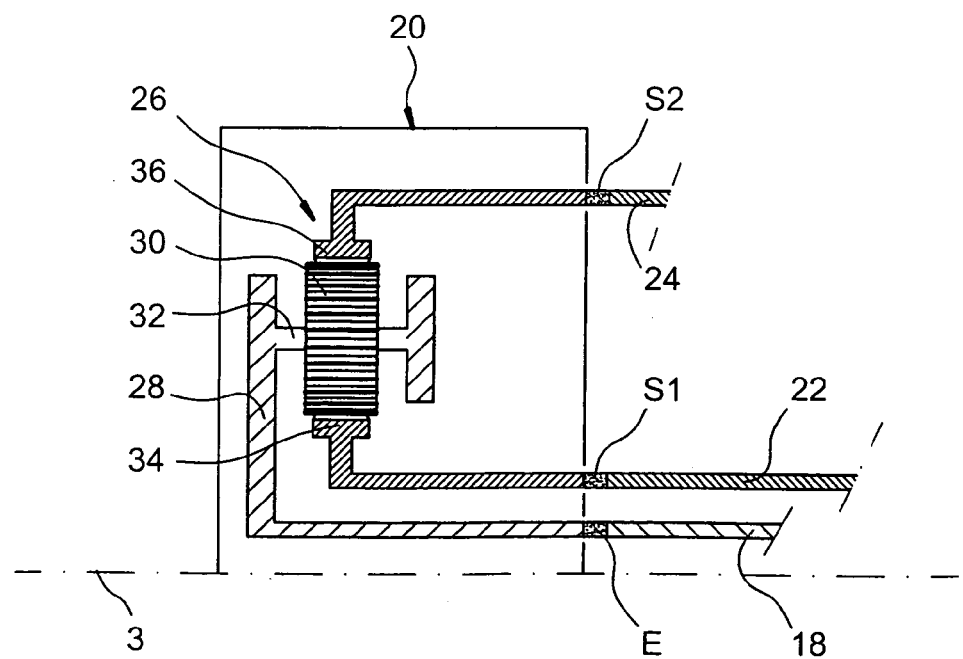
FIG. 2 represents a longitudinal half-section roughly illustrating a gear system meant to equip the turbine engine in FIG. 1.

As can be seen more specifically in FIG. 2 which roughly illustrates the principle of the gear system 20 used, the latter is made up overall of the torque control system 26 which will be shown in detail below.

This torque control system 26 is equipped with a satellite carrier 28 centred on the main longitudinal axis 3 of the turbine engine 1 and integral with the inlet E of the gear system 20 and therefore integral with the LP turbine shaft 18. The satellite carrier 28 has a multiplicity of satellite pinions 30 each equipped to turn around an axis linked 32 to the satellite carrier 28, each axis 32 arranged in parallel to the main longitudinal axis 3.

The satellite pinions 30 engage with a planetary pinion 34 centred on the main longitudinal axis 3 and integral with the first outlet S1 of the gear system 20 and therefore integral with the LP compressor shaft 22. In addition, the satellite pinions 30 also engage with a crown gear 36 also centred on the main longitudinal axis 3 and integral with the second outlet S2 of the gear system 20 and therefore integral with a receiver shaft 24.

It is specified that this principle of the gear system 20 is given as an illustration so as to facilitate understanding of the functioning of the torque control system 26. However, the gear system to be adopted will be equipped with one or more gear reducers linked to this control system 26 so that the rotation speed ratios of the various elements connected to the inlet E and the outlets S1 and S2 can easily be adhered to.

Figure 3:
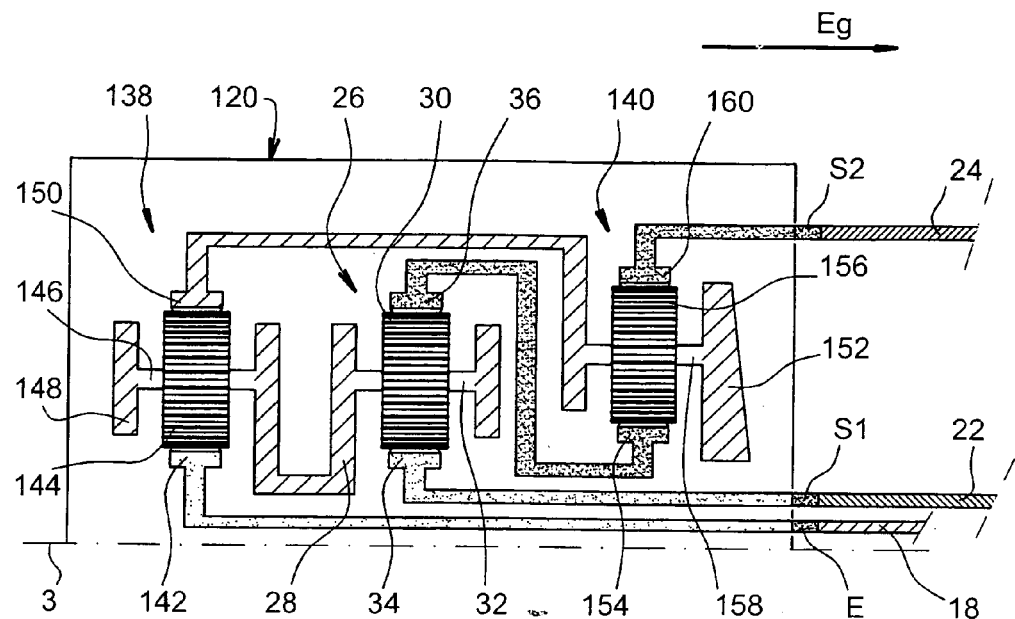
FIG. 3 represents a detailed longitudinal half-section of a gear system meant to equip the turbine engine in FIG. 1.

In this respect, FIG. 3 represents a gear system 120 completely adapted to equip the turbine engine 1 according the invention.

This gear system 120 is equipped going downstream in the main direction of the gas flow Eg of an epicycloidal reducer 138 of the torque control system 26 and a planetary reducer 140.

The epicycloidal reducer 138 has a planetary pinion 142 centred on the main longitudinal axis 3 of the turbine engine 1 and engaging with a multiplicity of satellite pinions 144, this planetary pinion 142 being integral with the inlet E and therefore integral with the LP turbine shaft 18. In addition the satellite pinions 144 are respectively carried on axes 146 parallel with the main longitudinal axis 3 and an integral part of a satellite carrier 148 of the epicycloidal reducer 138. Moreover, these satellite pinions 144 engage with a crown gear 150 of the epicycloidal reducer 138, this crown gear 150 being integral with a structure 152 playing the part of a satellite carrier of the planetary reducer 140 as clearly represented on FIG. 3.

The satellite carrier 148 of the epicycloidal reducer 138 is integral with the satellite carrier 28 of the torque control system 26 and therefore has the role of driving the latter. It is noted that the torque control system of this gear system 120 presents a roughly identical design with that of the torque control system of the gear system 20 displayed above. In this respect, as mentioned previously, the satellite carrier 28 has a multiplicity of satellite pinions 30 each equipped to turn around an associated axis 32 of the satellite carrier 28.

The satellite pinions 30 engage with the planetary pinion 34 centred on the main longitudinal axis 3 and integral with the first outlet S1 and therefore integral with the LP compressor shaft 22. In addition the satellite pinions 30 also engage with the crown gear 36 also centred on the main longitudinal axis 3 and integral with a planetary pinion 154 of the planetary reducer 140.

This planetary pinion 154 of the planetary reducer 140 engages with a multiplicity of satellite pinions 156 capable of turning around axes 158 that are an integral part of the structure 152 constituting the satellite carrier of the planetary reducer 140. Finally, these satellite pinions 156 also engage with a crown gear 160 of the planetary reducer 140 also centred on the main longitudinal axis 3 and integral with the second outlet S2 of gear system 120 and therefore integral with the receiver shaft 24.

Figure 4:
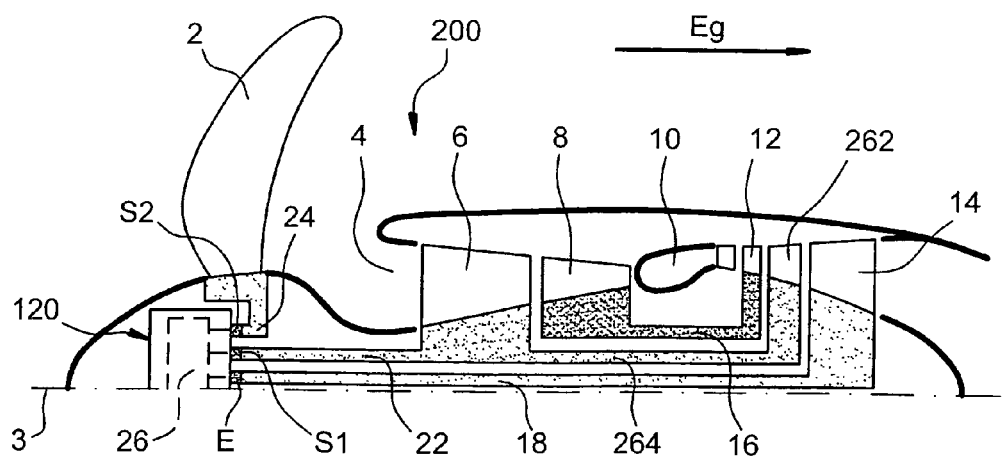
FIG. 4 represents a schematic view in longitudinal half-section of a turbine engine with semi-fixed turbine according to a preferred second embodiment of the present invention.

FIG. 4 represents a turbine engine 200 with a semi-fixed turbine, particularly for aircraft according to a preferred second embodiment of the present invention.

The turbine engine 200, going downstream in the main direction of the gas flow Eg, includes an annular intake of air 4 an LP compressor 6 an HP compressor 8 a combustion chamber 10 an HP turbine 12, an intermediate turbine 262 and an LP turbine 14. As can be seen on FIG. 4 turbine engine 200 drives a receiver 2 arranged upstream of the intake of air 4 and controlled so as to preserve a roughly constant rotation speed whatever the power required from this turbine engine 200, the receiver 2 being preferably the variable pitch propeller type.

Moreover, still in the same way as before, the turbine engine 200 has a gear system 120 equipped with a torque control system 26 maintaining a constant ratio with the driver torque of the receiver 2 transmitted by the gear system 120 and the driver torque of the LP compressor 6 transmitted by this same gear system 120.

Therefore the main difference between the turbine engine 1 according to the preferred first embodiment and the turbine engine 200 according to the preferred second embodiment, resides in the fact that in the latter the intermediate turbine 262 participates in the drive of the LP compressor 6 using an intermediate turbine shaft 264 which is therefore also integral with the LP compressor shaft 22.

In this respect, it is indicated that the intermediate turbine 262 is dimensioned so as to provide only part of the power absorbed by the LP compressor 6, the other part being of course delivered by the LP turbine 14 and transmitted via the torque control system 26. In this way since only part of the overall driver torque of the LP compressor 6 is proportionate to the couple absorbed by the propeller 2, the reduction in the rotation speed of the LP compressor 6 is less marked at low speed and its performance is thus roughly optimised.

Of course the principle of the gear system provided for this turbine engine 200 and indicated by the numerical reference 120 can be similar to the principle of the gear system 120 described above in relation to the turbine engine 1 according to the preferred first execution mode of the present invention, but it of course has different ratios.

Of course, various modifications can be applied by a professional to the turbine engine for aircraft 1 and 200 which have just been described solely as non-restrictive examples.

The invention claimed is:

1. A turbine engine with a semi-fixed turbine for aircraft, configured to drive a receiver in order to preserve a roughly constant rotation speed, the turbine engine, comprising:
   an LP compressor;
   an HP compressor;
   a combustion annulus;
   an HP turbine; and
   an LP turbine which, via a gear system, is configured to drive the receiver and the LP compressor,
   wherein the gear system has a torque control system configured to maintain a constant ratio between a driver torque of the receiver transmitted by the gear system and a driver torque of the LP compressor transmitted by the gear system and the torque control system is further configured to decrease a rotation speed of the LP compressor while maintaining a rotation speed of the receiver roughly constant,
   wherein the gear system has an inlet integral with an LP turbine shaft as well as first and second outlets, the first outlet being integral with an LP compressor shaft and the second outlet being integral with a receiver shaft, and
   wherein the torque control system has a satellite carrier connected to the entrance of the gear system and with a multiplicity of satellite pinions engaging with a planetary pinion linked to the first outlet of the gear system and with a crown gear connected to the second outlet of the gear system.

2. The turbine engine according to claim 1, wherein the turbine engine also has an HP turbine shaft integral with the HP turbine shaft and the HP compressor.

3. The turbine engine according to claim 1 or claim 2, wherein the turbine engine also has an intermediate turbine arranged between the HP turbine and the LP turbine, and the intermediate turbine is connected integrally with the LP compressor using an intermediary turbine shaft.

4. The turbine engine according to claim 1 or claim 2, wherein the receiver is an element taken from the group made up of a variable pitch propeller, a variable pitch Prop-Fan, a counter-rotary propeller doublet, a counter-rotary variable pitch Prop-Fan doublet, a helicopter rotor and an alternator.

5. The turbine engine according to claim 1, wherein the satellite carrier is centered on a main longitudinal axis of the turbine engine.

6. The turbine engine according to claim 5, wherein the multiplicity of satellite pinions are configured to rotate around an axis linked to the satellite carrier, the axis arranged in parallel to the main longitudinal axis.

7. The turbine engine according to claim 1, wherein the receiver is only driven by the LP turbine.

8. The turbine engine according to claim 1, wherein the gear system includes one or more gear reducers.

9. The turbine engine according to claim 1, wherein the torque control system includes an epicycloidal reducer and a planetary reducer, the epicycloidal reducer includes a planetary pinion centered on a main longitudinal axis of the turbine engine and is configured to engage with a multiplicity of satellite pinions.

* * * * *